(12) United States Patent
Chu et al.

(10) Patent No.: US 11,387,955 B2
(45) Date of Patent: Jul. 12, 2022

(54) AGGREGATE MAC SERVICE DATA UNIT (A-MSDU) AND AGGREGATE MAC PROTOCOL DATA UNIT (A-MPDU) OF NEXT GENERATION V2X (NGV) STATION (STA)

(71) Applicant: NXP USA, Inc., Austin, TX (US)

(72) Inventors: Liwen Chu, San Ramon, CA (US); Rui Cao, Sunnyvale, CA (US); Hongyuan Zhang, Fremont, CA (US); Huiling Lou, Sunnyvale, CA (US)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 17/095,625

(22) Filed: Nov. 11, 2020

(65) Prior Publication Data
US 2021/0143951 A1    May 13, 2021

Related U.S. Application Data

(60) Provisional application No. 62/933,871, filed on Nov. 11, 2019.

(51) Int. Cl.
*H04L 5/00* (2006.01)
*H04W 80/02* (2009.01)
(Continued)

(52) U.S. Cl.
CPC .......... *H04L 5/0044* (2013.01); *H04L 1/1614* (2013.01); *H04L 1/1621* (2013.01);
(Continued)

(58) Field of Classification Search
None
See application file for complete search history.

(56) References Cited

U.S. PATENT DOCUMENTS

| 2012/0155518 A1 | 6/2012 | Nakamura et al. |
| 2012/0201196 A1 | 8/2012 | Merlin et al. |

(Continued)

OTHER PUBLICATIONS

Liwen Chu et al., MU Minimum MPDU Start Spacing, document IEEE802.11-16/0645r0, May 16, 2016.
(Continued)

*Primary Examiner* — Diane L Lo (57) ABSTRACT

In an IEEE 802.11bc wireless system, aggregated data frames are communicated between first and second STA devices by configuring the first STA device to assemble and transmit an A-MPDU frame having multiple A-MPDU subframes characterized by a fixed MPDU start spacing parameter and a fixed maximal MPDU length parameter, where the first STA device is configured with the fixed MPDU start spacing parameter and the fixed maximal MPDU length parameter without negotiating association request and response messages, and by configuring the second STA device to assemble and transmit a BA message comprising a BA bitmap identifying the one or more of the multiple A-MPDU subframes which are not successfully received by the second STA device, where the BA bitmap has a size characterized by a fixed buffer size parameter which is configured at the second STA device without negotiating add BA request (ADDBA Request) request and response messages.

17 Claims, 7 Drawing Sheets

(51) Int. Cl.
  *H04W 28/06* (2009.01)
  *H04L 1/16* (2006.01)
  *H04W 4/40* (2018.01)

(52) U.S. Cl.
  CPC ........... *H04W 4/40* (2018.02); *H04W 28/065* (2013.01); *H04W 80/02* (2013.01)

(56) References Cited

U.S. PATENT DOCUMENTS

| | | | |
|---|---|---|---|
| 2016/0381599 A1 | 12/2016 | Ram et al. | |
| 2017/0303164 A1* | 10/2017 | Chu | H04B 7/0452 |
| 2018/0338266 A1* | 11/2018 | Sakai | H04L 1/1614 |
| 2019/0069213 A1 | 2/2019 | Seok et al. | |
| 2019/0268099 A1* | 8/2019 | Chu | H04B 7/2612 |
| 2019/0268739 A1* | 8/2019 | Cariou | H04L 5/0007 |
| 2019/0289495 A1* | 9/2019 | Chu | H04L 1/1835 |
| 2020/0008201 A1 | 1/2020 | Kenney et al. | |
| 2020/0145145 A1 | 5/2020 | Chu et al. | |
| 2020/0229032 A1 | 7/2020 | McCann et al. | |
| 2021/0083805 A1* | 3/2021 | Kneckt | H04L 1/1854 |

OTHER PUBLICATIONS

James Lepp, Frame Aggregation for NGV, document IEEE 802.11-19/1502r0, Sep. 10, 2019.
Liwen Chu et al., A-MPDU and BA, document IEEE 802.11-19/1856r3, Nov. 6, 2019.
Liwen Chu et al., A-MSDU and A-MPDU, document IEEE 802.11-19/1970r0, Nov. 8, 2019.
Yongsoo Kim et al., Adaptive two-level frame aggregation in IEEE 802.11m WLAN, Conference Paper, Oct. 2012.
Kai-Ten Feng et al., Frame-Aggregated Link Adaptation Protocol for Next Generation Wireless Local Area Networks, EURASIP Journal on Wireless Communications and Networking, vol. 2010, Article ID 164651, 12 pages, received Aug. 4, 2009, revised Feb. 11, 2010, accepted May 10, 2010.
NXP Semiconductors, JN-AN-1035 Calculating 802-15-4 Data Rates, Application Note, Rev. 1.4, Apr. 28, 2020.
Kees Moerman, NXP, Next Generation Vehicular Networks: IEEE802.11bd, Way of Working and Progress, Mar. 3, 2019.

* cited by examiner

AGGREGATE MAC SERVICE DATA UNIT (A-MSDU) AND AGGREGATE MAC PROTOCOL DATA UNIT (A-MPDU) OF NEXT GENERATION V2X (NGV) STATION (STA)

CROSS-REFERENCE TO RELATED APPLICATION AND PRIORITY CLAIM

This application claims the benefit of U.S. Provisional Patent Application No. 62/933,871, entitled "Aggregate MAC Service Data Unit (A-MSDU) And Aggregate MAC Protocol Data Unit (A-MPDU) Of Next Generation V2x (NGV) Station (STA)" filed on Nov. 11, 2019, which is incorporated by reference in its entirety as if fully set forth herein.

BACKGROUND

Field

The present disclosure is directed in general to communication networks. In one aspect, the present disclosure relates generally to frame aggregation in wireless communications.

Description of the Related Art

An ever-increasing number of relatively inexpensive, low power wireless data communication services, networks and devices have been made available over the past number of years, promising near wire speed transmission and reliability. Enabling technology advances in the area of wireless communications, various wireless technology standards (including for example, the IEEE Standards 802.11a/b/g, 802.11n, and 802.11ac and their updates and amendments, as well as the IEEE Standard 802.11ax now in the process of being adopted) have been introduced that are known to persons skilled in the art and are collectively incorporated by reference as if set forth fully herein fully. These standards specify various methods of establishing connections between wireless devices. For example, various frame aggregation techniques are specified for efficiently communicating on a shared link or channel with minimum time slot by sending two or more data frames in a single transmission. However, such techniques conventionally require that wireless devices must first advertise their capabilities in the course of negotiating association request and response messages before transmitting any aggregated data frames, thereby imposing signal processing overhead, time delays, and consumption of valuable transmission bandwidth that can impair interoperability between wireless devices. As seen from the foregoing, the existing solutions for data frame aggregation are extremely difficult at a practical level by virtue of the difficulty in balancing increased data signaling with the overhead, processing, and timings costs required for negotiating data frame aggregation signaling.

BRIEF DESCRIPTION OF THE DRAWINGS

The present invention may be understood, and its numerous objects, features and advantages obtained, when the following detailed description of a preferred embodiment is considered in conjunction with the following drawings.

DETAILED DESCRIPTION

A system, apparatus, and methodology are described wherein wireless communication station (STA) devices use fixed A-MSDU and/or A-MPDU operation parameters for directly enabling data frame aggregation in direct intervehicular wireless connectivity applications, thereby promoting interoperability and data throughput efficiency with Next Generation Vehicle-to-Everything (NGV) communications. Instead of exchanging association request and response messages to negotiate the transmission of aggregated data frames, each NGV wireless communication station (STA) device may be configured with predetermined operational parameters for A-MPDU and/or A-MSDU data frame aggregation in conformance with the applicable 802.11 specification so that every NGV STA device supports the same A-MSDU, A-MPDU operation parameters. Example operational parameters that can be fixed at each NGV STA device include, but are not limited to, a Maximal MPDU Length parameter value (e.g., 7991 octets), an MPDU Start Spacing value (e.g., 2 µs) (which can be a Minimal or Maximal MPDU Start Spacing value), and a minimum required Block ACK buffer size value for storing received MPDUs (e.g., 32 MPDUs). By specifying predetermined A-MPDU and/or A-MSDU operational parameters at each NGV STA device, such as the Maximal MPDU Length parameter and MPDU Start Spacing values, interoperability is simplified between the NGV STA devices as there is no requirement of negotiation signaling overhead or MAC data service interface changes. In similar fashion, by specifying the Block ACK buffer size value as a predetermined operational or hardware parameter at each NGV STA device, device interoperability is enhanced by allowing Block ACK operation without requiring Block ACK negotiation.

In the context of the present disclosure, it will be understood by those skilled in the art that the IEEE 802.11 standard (a.k.a., Wi-Fi) has been amended to enable safe driving services based on Dedicated Short-Range Communications (DSRC) for the Wireless Access in Vehicular Environments (WAVE) system. In particular, the Physical Layer (L1) and Data Link Layer (L2) issues are addressed in IEEE 802.11p standard for the PHY and MAC of the DSRC. The IEEE 802.11p standard, also referred to as the IEEE 802.11 Outside the Context of a Basic Service Set (OCB), has been used by automotive vehicles which use IEEE 802.11p-compliant wireless communication systems. In addition, improvements to such wireless communication systems are being developed for the future of vehicular networking by the IEEE Next Generation V2X (NGV) task group which will be designated IEEE 802.11bd. The essential goal of NGV is to provide a seamless evolution path for IEEE-based V2X communications, with better spectral efficiency, better reliability, extended range, or a combination of those. While NGV communications will improve performance with new features and additional services, NGV communications must also continue satisfying all the current use cases requirements and ensure backwards compatibility to existing IEEE 802.11 standards.

For example, IEEE 802.11 communications provide a frame aggregation feature in which data frames are aggregated together into a single transmission, with frame aggregation being defined in the IEEE 802.11-2016 WLAN standard to increase throughput by sending two or more data frames in a single transmission, and with the IEEE 802.11ax (High Efficiency WLAN) amendment and the IEEE 802.11bd amendment enabling both A-MSDU and A-MPDU operation to work for unicast OCB and not to exceed the constraints on A-MSDU in A-MPDU as defined in 802.11ac. In particular, an Aggregate MAC Service Data Unit (A-MSDU) collects MSDUs to be transmitted to one or more destinations and wraps them in a single 802.11n frame, resulting in aggregate efficiencies since multiple MSDUs share the same MAC headers. In similar fashion, an Aggregate MAC Protocol Data Unit (A-MPDU) collects frames to be transmitted to a single destination, but it wraps multiple frames in a PPDU and provides a single "Block Ack" (BA) acknowledgment frame for a group of frames, where the Block Ack has the capability to point out individual sequence numbers that were not received so that only those individual frames have to be retransmitted. While normally less efficient than the combination of MSDU aggregation and MPDU aggregation, MPDU aggregation (A-MPDU) without A-MSDU is actually more efficient in environments with high error rates since the Block Ack mechanism allows each of the aggregated data frames to be individually acknowledged or retransmitted if affected by an error. With existing 802.11 standards (e.g., 802.11bd), both A-MSDU and A-MPDU operation are enabled to work for unicast OCB and not to exceed the constraints on A-MSDU in A-MPDU as defined in 802.11ac. However, the existing 802.11 standards are conventionally implemented by requiring that the wireless communication devices exchange negotiation request and response messages to enable aggregate-MPDU data frame transmission with block acknowledgement, thereby imposing signal processing overhead, time delays, and consumption of valuable transmission bandwidth that can impair interoperability between wireless communication devices.

Figure 1:
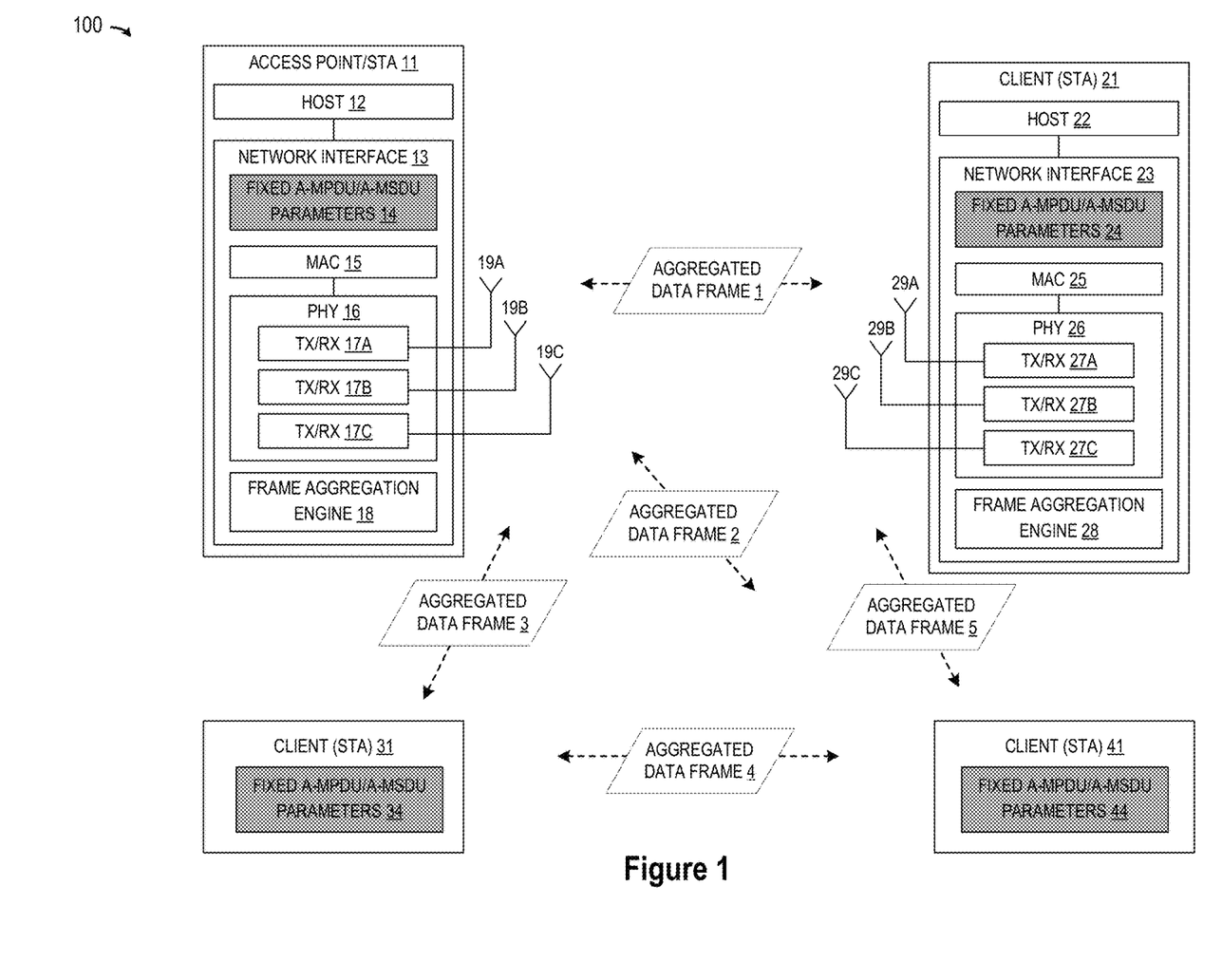
FIG. 1 is a block diagram of a wireless local area network (WLAN) in which wireless communication station (STA) devices transmit and receive aggregated data frames in accordance with selected embodiments of the present disclosure.

To provide a contextual understanding for selected embodiments of the present disclosure, reference is now made to FIG. 1 which shows a block diagram of a wireless local area network (WLAN) 100 in which an access point 11 and one or more wireless devices 21, 31, 41 transmit and receive aggregated data frames 1-5. To simplify the present disclosure, FIG. 1 will be used to illustrate both the conventional approaches and Applicant's disclose approaches for transmitting aggregated data frames to and from wireless communication station (STA) devices. In the ensuing description, reference is made to Table 1 which sets forth descriptions of acronyms or abbreviations used herein:

TABLE 1

| Acronym | Full text | Brief Description |
|---|---|---|
| A-MPDU | Aggregate Medium Access Control (MAC) (A-MPDU) | A structure that contains one or more MPDUs and is transported by a physical layer (PHY) as a single Protocol Data Unit PHY service data unit (PSDU) |
| A-MSDU | Aggregate Medium Access Control (MAC) Service Data Unit (A-MSDU) | A structure that contains one or more MSDUs and is transported within a single (unfragmented) data medium access control (MAC) protocol data unit (MPDU). |
| BSS | Basic Service Set | For a wireless local area network (WLAN), this includes an Access Point and its connected devices. |
| MPDU | MAC Protocol Data Unit | |
| NGV | Next Generation Vehicle | Sometimes referred to as "Next Generation Vehicle to Anything." New term for a device operating in an enhanced OCB mode. |
| OCB | Outside the Context of BSS | For a WLAN, this is a term for ad-hoc communications between devices, such as in a vehicular context. "OCB" can also refer to "extended OCB" that extends features of OCB beyond those of current standards. |
| PHY | Physical Layer | IEEE 802.11 term for a wireless physical layer |
| STA | STAtion | IEEE 802.11 wireless device. This can include both a wireless device and an access point. |
| V2X | Vehicle to Anything | Anything can be Vehicle, Anything Infrastructure etc. |

As depicted, the AP 11 includes a host processor 12 coupled to a network interface 13. In selected embodiments, the network interface 13 includes one or more integrated circuits (IC) devices configured to operate a local area network (LAN) protocol. To this end, the network interface 13 may include a medium access control (MAC) processor 15 and a physical layer (PHY) processor 16. In selected embodiments, the MAC processor 15 is implemented as an 802.11bc MAC processor 15, and the PHY processor 16 is implemented as an 802.11bc PHY processor 16. The PHY processor 16 includes a plurality of transceivers 17 which are coupled to a plurality of antennas 19. Although three transceivers 17A-C and three antennas 19A-C are illustrated, the AP 11 may use any suitable number of transceivers 17 and antennas 19 in other embodiments. In addition, the AP 11 may have more antennas 19 than transceivers 17, in which case antenna switching techniques are used to switch the antennas 19 between the transceivers 17. In selected embodiments, the MAC processor 15 is implemented with one or more integrated circuit (IC) devices, and the PHY processor 16 is implemented on one or more additional IC devices. In other embodiments, at least a portion of the MAC processor 15 and at least a portion of the PHY processor 16 are implemented on a single IC device.

In various embodiments, the MAC processor 15 and the PHY processor 16 are configured to operate according to at least a first communication protocol (e.g., 802.11bd). In other embodiments, the MAC processor 15 and the PHY processor 16 are also configured to operate according to one or more additional communication protocols (e.g., according to the IEEE 802.11ac Standard). Using the communication protocol(s), the AP device 11 is operative to create a wireless local area network (WLAN) 100 in which one or more client stations (e.g., 21) may communicate with the AP 11 and/or with other client stations (e.g., 31, 41) located within the WLAN 10. Although three client stations 21, 31, 41 are illustrated in FIG. 1, the WLAN 100 may include any suitable number of client stations in various scenarios and embodiments.

At least one of the client stations (e.g., client station 21) is configured to operate at least according to the first communication protocol. To this end, the client station 21 includes a host processor 22 coupled to a network interface 23. In selected embodiments, the network interface 23 includes one or more IC devices configured to operate as discussed below. For example, the depicted network interface 23 may include a MAC processor 25 and a PHY processor 26. In selected embodiments, the MAC processor 25 is implemented as an 802.11bc MAC processor 25, and the PHY processor 26 is implemented as an 802.11bc PHY processor 26. The PHY processor 26 includes a plurality of transceivers 27 coupled to a plurality of antennas 29. Although three transceivers 27A-C and three antennas 29A-C are illustrated, the client station 21 may include any suitable number of transceivers 27 and antennas 29. In addition, the client station 21 may include more antennas 29 than transceivers 27, in which case antenna switching techniques are used. In selected embodiments, the MAC processor 25 is implemented on at least a first IC device, and the PHY processor 26 is implemented on at least a second IC device. In other embodiment, at least a portion of the MAC processor 25 and at least a portion of the PHY processor 26 are implemented on a single IC device. As will be appreciated, one or both of the client stations 31, 41 may have a structure that is the same as or similar to the client station 21, though there can be structural differences.

In the WLAN 10, the AP 11 and each client station 21, 31, 41 is able to communicate by implementing a frame aggregation engine (e.g., 18, 28) for aggregating a plurality of data frames in a single aggregated data frame (e.g., 1) for communication over a communication link. With earlier 802.11 protocols, the AP 11 is able to directly exchange aggregated data frames 1, 2, 3 with the client stations 21, 31, 41, by the client stations 21, 31, 41 do not directly exchange aggregated data frames with each other. In later 802.11 protocols, the client stations 21, 31, 41, are able to directly exchange aggregated data frames 4, 5 with each other, as well as with the AP 11. To this end, the AP 11 and client stations 21, 31, 41 may each include a MAC processor and PHY processor which are configured to generate data units conforming to the first communication protocol and having formats described herein. For example, the MAC processor 15 at the AP 11 may be configured to implement 802.11bc MAC layer functions, including MAC layer functions of the first communication protocol. In addition, the PHY processor 16 at the AP 11 may be configured to implement 802.11bc PHY functions, including PHY functions of the first communication protocol. In particular, the MAC processor 15 may be configured to generate MAC layer data units (such as MPDUs, MAC control frames, A-MPDUs, etc.) that are provided to the PHY processor 16 which is configured to encapsulate the received MAC layer data units to generate PHY data units, such as PHY protocol data units (PPDUs) for transmission via the antennas 19. Similarly, the PHY processor 16 may be configured to receive PHY data units that were received via the antennas 19, and extract MAC layer data units encapsulated within the PHY data units. In response, the PHY processor 16 provides the extracted MAC layer data units to the MAC processor 15, which processes the MAC layer data units.

To enhance data throughput, the MAC processor 15 may be configured with the frame aggregation engine 18 to assemble and transmit aggregated IEEE 802.11 data frames, specifically A-MPDUs and A-MSDUs, to be used in an NGV mode for wireless communicating aggregated data frames between any of the AP 11 and client stations 21, 31, 41. For example, A-MSDUs can be assembled by aggregating multiple data frames can include removing Medium Access Control (MAC) headers of the multiple data frames and aggregating remaining portions of the multiple data frames without the MAC headers into the aggregated data frame. In addition or in the alternative, A-MPDUs can be assembled by aggregating multiple data frames with MAC headers. However, before transmitting any aggregated data frame (e.g., 1) between two wireless communication station devices (e.g., 11, 21), the wireless devices 11, 21 have conventionally been required to exchange request and response messages to advertise the capabilities of each device and to negotiate the agreed performance parameters for transmitting and receiving any such aggregated data frame.

Figure 2:
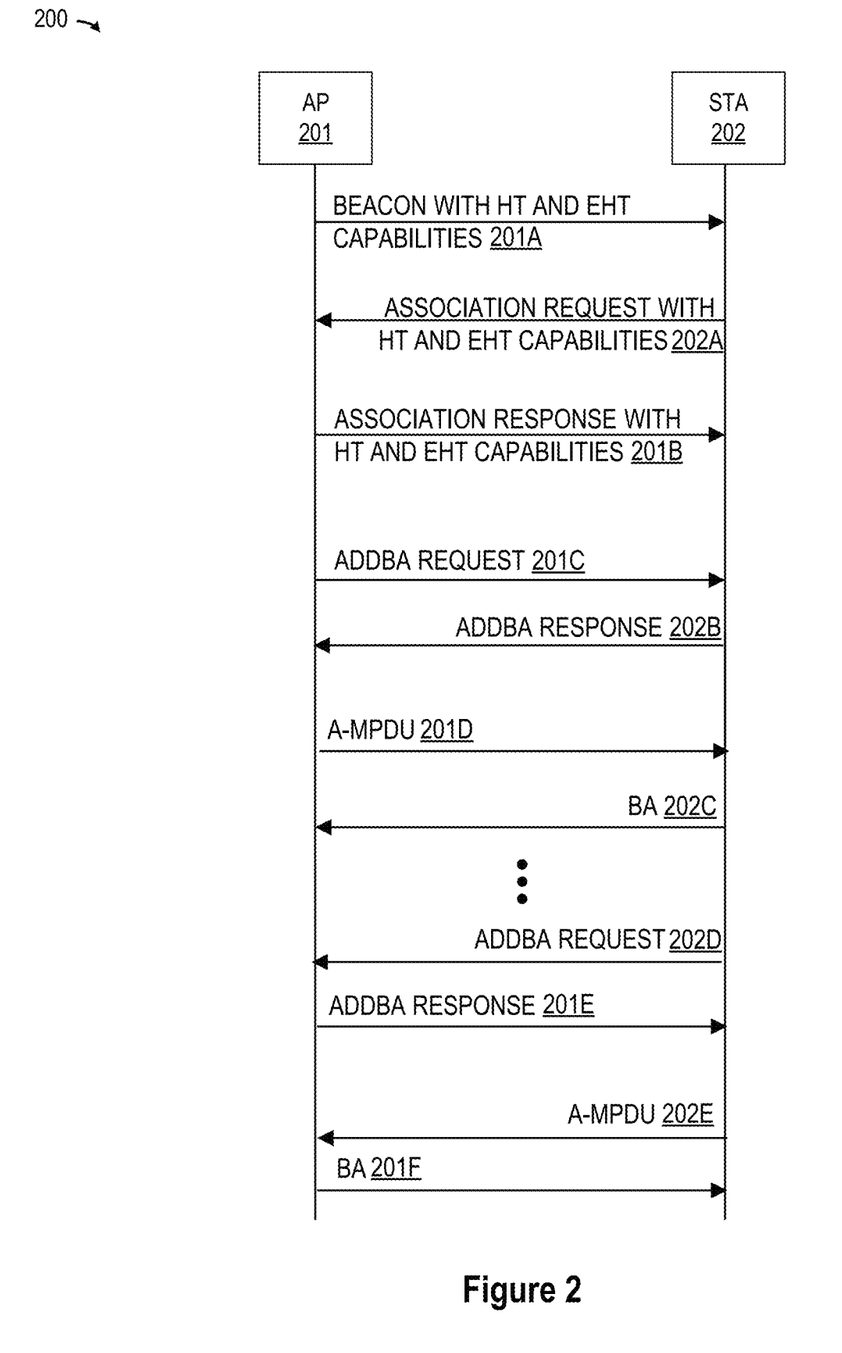
FIG. 2 illustrates an example signaling sequence between an access point and wireless communication station (STA) device which exchange negotiation messages to set up a conventional 802.11 basic service set to enable aggregate-MPDU data frame transmission with block acknowledgement.

To provide an improved contextual understanding of how wireless devices conventionally negotiate agreed performance parameters for aggregated data frame transmission, reference is now made to FIG. 2 which illustrates a signaling sequence 200 between an access point 21 and wireless communication station (STA) device 22 which exchange negotiation messages 21A-F, 22A-E to set up a conventional 802.11 basic service set which enables aggregate-MPDU data frame transmission with block acknowledgement. To initiate the network connection, the AP 201 sends a beacon message 201A to multiple STA devices 202 which identifies the high throughput (HT), Very High Throughput (VHT), and/or Extremely HT (EHT) capabilities of the AP 201. In response, the STA device 202 sends an association request message 202A to the AP 201 which identifies the HT, VHT, and/or EHT capabilities of the STA device 202. In response to the association request message 202A, the AP 201 sends an association response message 201B to the ST device 202 which identifies the agreed HT, VHT, and/or EHT capabilities. At this point in the negotiation process, the AP 201 and STA device 202 both know selected A-MSDU and A-MPDU operational parameters (e.g., Maximal MPDU size and A-MPDU length) of one another by virtue of having used signaling overhead messages to advertise their respective capabilities.

The signaling sequence 200 continues to exchange negotiation messages when the AP 201 sends an add BA request (ADDBA Request) message 201C to the STA device 202 to establish the BA session which may include a traffic identifier (TID) signaling the access category of the session under-negotiation, as well as the BA policy and the block size recommended by the AP 201. If the ADDBA Request is approved, the STA device 202 sends an ADDBA Response message 202B to the AP 201 which identifies number of frames of the allowed BA buffer size at the STA device 202. At this point in the negotiation process, the AP 201 can transmit A-MPDUs to the STA device 202 that satisfy the BA buffer size (the number of frames in A-MPDU is less than the negotiated size), Minimum MPDU Start Spacing, Maximum MPDU Size, and Maximum A-MPDU length until the BA session is torn down with a so-called DELBA frame. As a result, the AP 201 is now configured to send a multi-frame A-MPDU message 201D to the STA device 202 which responds with the appropriate block acknowledgement (BA) message 202C to identify individual sequence numbers that were not received so that only those individual frames have to be retransmitted.

To support multi-frame A-MPDU messaging in the reverse direction, the STA device 202 may send an ADDBA Request message 202D to the AP 201 to establish a corresponding the BA session, where the ADDBA Request message 202D may include the block size recommended by the STA device 202. If the ADDBA Request is approved, the AP 201 sends an ADDBA Response message 201E to the STA device 202 which identifies the number of frames of the allowed BA buffer size at the AP 201. At this point in the negotiation process, the STA device 202 can transmit A-MPDUs to the AP 201 that satisfy the BA buffer size (the number of frames in A-MPDU is less than the negotiated size), Minimum MPDU Start Spacing, Maximum MPDU Size, and Maximum A-MPDU length until the BA session is torn down. As a result, the STA device 202 is now configured to send a multi-frame A-MPDU message 202E to the AP 201 which responds with the appropriate block acknowledgement (BA) message 201F to identify individual sequence numbers that were not received so that only those individual frames have to be retransmitted.

While data frame aggregation was introduced in 802.11 network protocols to improve network efficiency, there can be still be significant overhead required to acquire the channel for aggregate data frame transmission since such protocols do not include prescriptive requirements for data frame aggregation, but instead define only the aggregate frame format for signaling A-MPDU and/or A-MSDU frame aggregation as part of a device negotiation process. For example, one or more A-MPDU parameters may be negotiated by the wireless devices 21, 22 by exchanging management frame messages (e.g., beacon 201A, association request 202A, association response 201B) to signal their capabilities for building or participating in an 802.11 network. For example, the STA device 202 may provide a capability indication that includes an indicator value, which is used in combination with one or more other parameters known to the STA 202 and the AP 201 to determine the operation of A-MPDU and/or A-MSDU frame aggregation.

Figure 3:
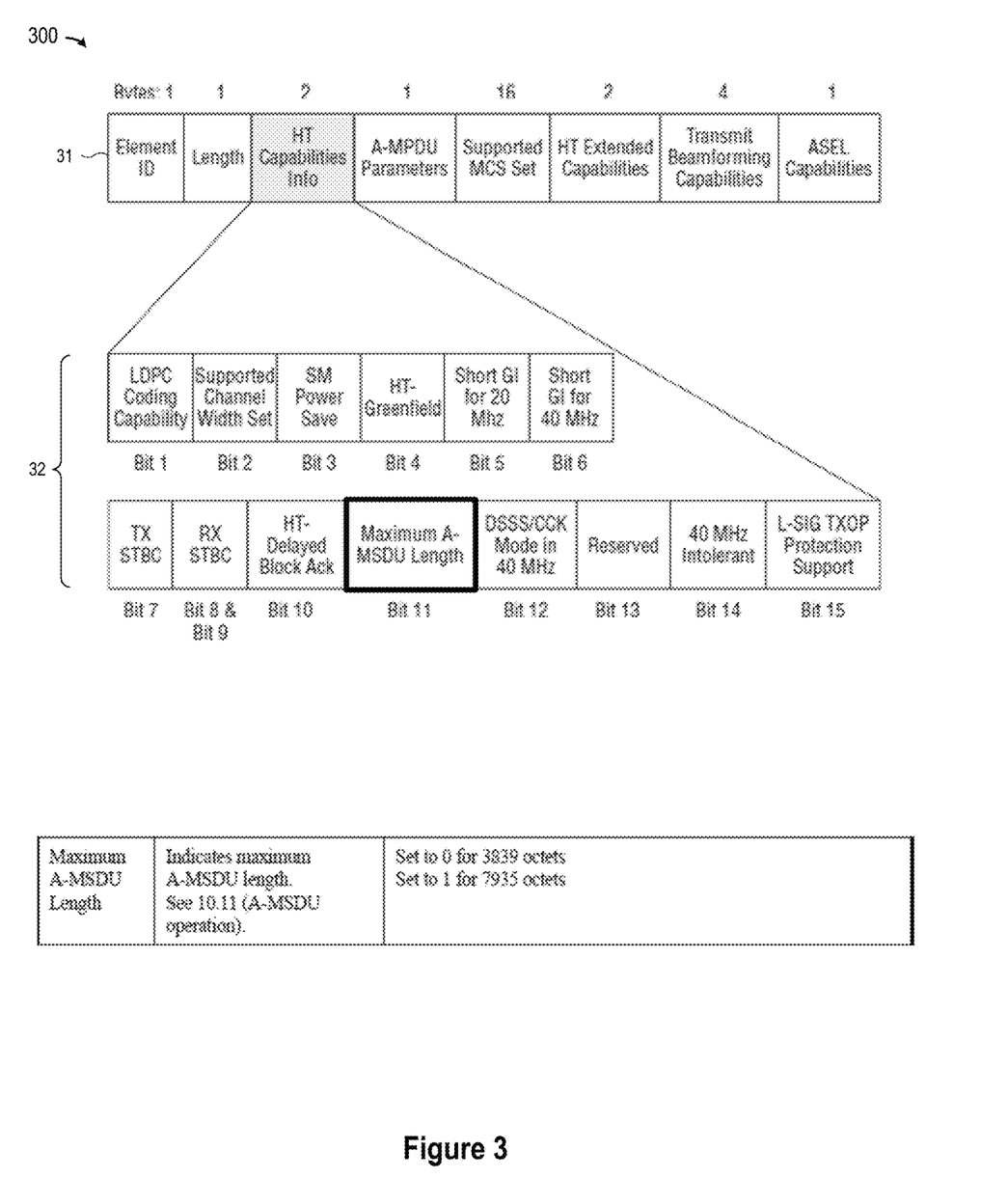
FIG. 3 illustrates a message format for a conventional 802.11 HT capabilities announcement message that is transmitted by a wireless communications device during negotiation of A-MSDU transmissions.

To provide a contextual understanding of how an STA device may declare its A-MSDU frame aggregation capabilities, reference is now made to FIG. 3 which illustrates a message format 300 for an 802.11 High Throughput (HT) capabilities element 31 that is transmitted in a message (such as a Beacon, Probe Request, Probe Response, Association Request, Association Response, Reassociation Request & Reassociation Response frames) to define the size of an aggregated packet and also define the proper spacing between aggregated packets so that the receive side WLAN station is able to decode the packet properly. As depicted, the HT capabilities element 31 includes an element ID field (1 byte), length field (1 byte), HT capabilities info field (2 bytes), A-MPDU parameters field (1 byte), supported MCS set field (16 bytes), HT extended capabilities field (2 bytes), transmit beamforming capabilities field (4 bytes), and ASEL capabilities field (1 byte). In the HT capabilities info field 32, there are specified a number of fields, including a Maximum A-MSDU Length field (1 bit) which indicates the maximum length of the A-MSDU that the STA device can receive by specifying a maximum A-MSDU length of 3839 octets if the bit is set to 0, and a maximum A-MSDU length of 7935 octets if the bit is set to 1.

Figure 4:
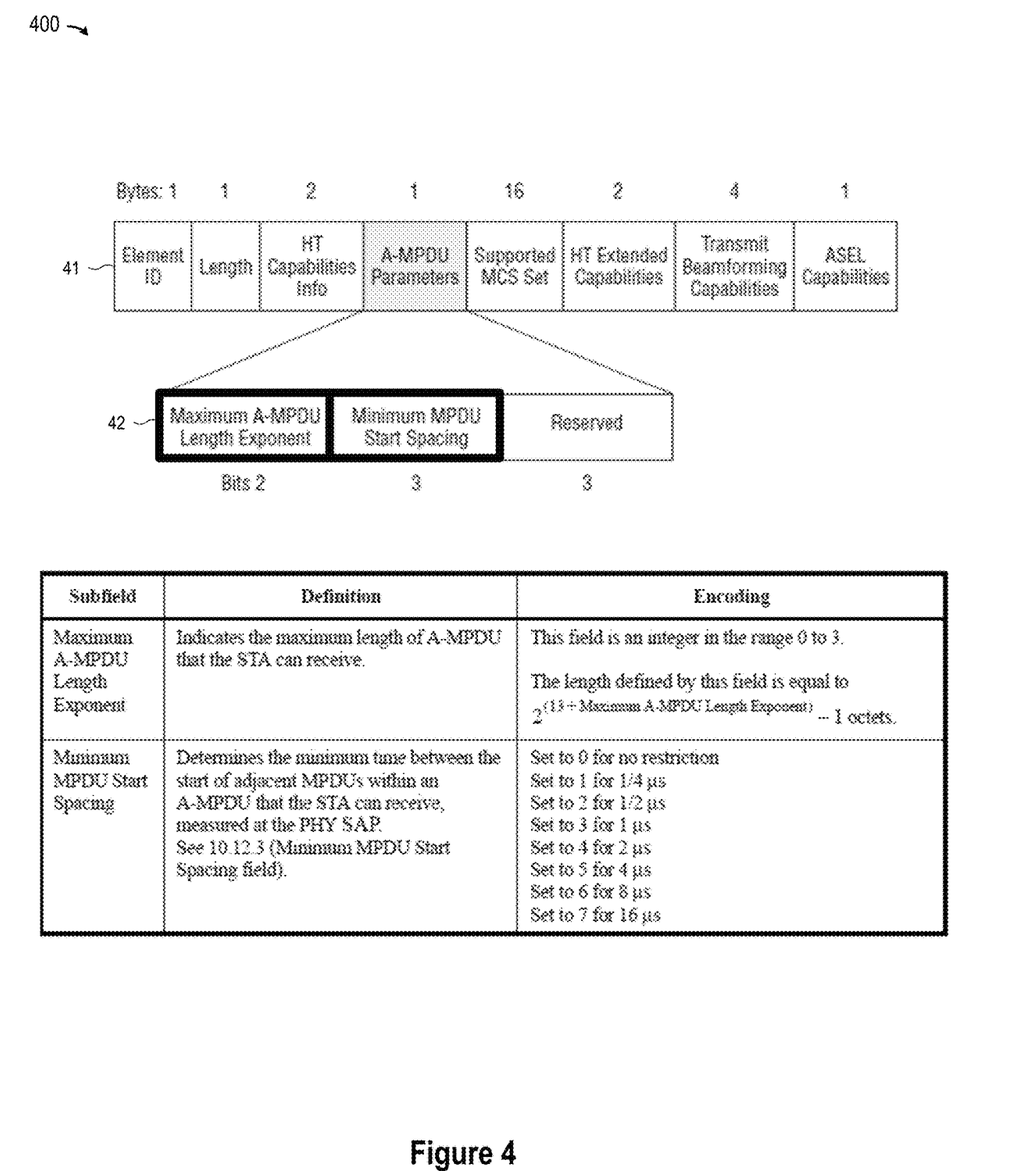
FIG. 4 illustrates a message format for a conventional 802.11 High Throughput (HT) capabilities announcement message that is transmitted by a wireless communications device during negotiation of A-MPDU transmissions.

To provide additional contextual understanding of how an STA device may declare its A-MPDU frame aggregation capabilities, reference is now made to FIG. 4 which illustrates a message format 400 for an 802.11 High Throughput (HT) capabilities element 41 that includes an element ID field (1 byte), length field (1 byte), HT capabilities info field (2 bytes), A-MPDU parameters field (1 byte), supported MCS set field (16 bytes), HT extended capabilities field (2 bytes), transmit beamforming capabilities field (4 bytes), and ASEL capabilities field (1 byte). In the A-MPDU parameters field 42, there is specified a Maximum A-MPDU Length Exponent field (2 bits), a Minimum MPDU Start Spacing Field (3 bits), and a Reserved field (3 bits). The Maximum A-MPDU Length Exponent field indicates the maximum length of the A-MPDU that the STA device can receive by specifying an encoding with an integer value i between 0 and 3 for calculating a maximum length value of $(2^{(13+i)})-1$ octets. The Minimum MPDU Start Spacing Field specifies the minimum time between the start of adjacent PMDUs with an A-MPDU that the STA device can receive as measures at the PHY SAP using the indicating encoding of minimum times and 3-bit values.

Figure 5:
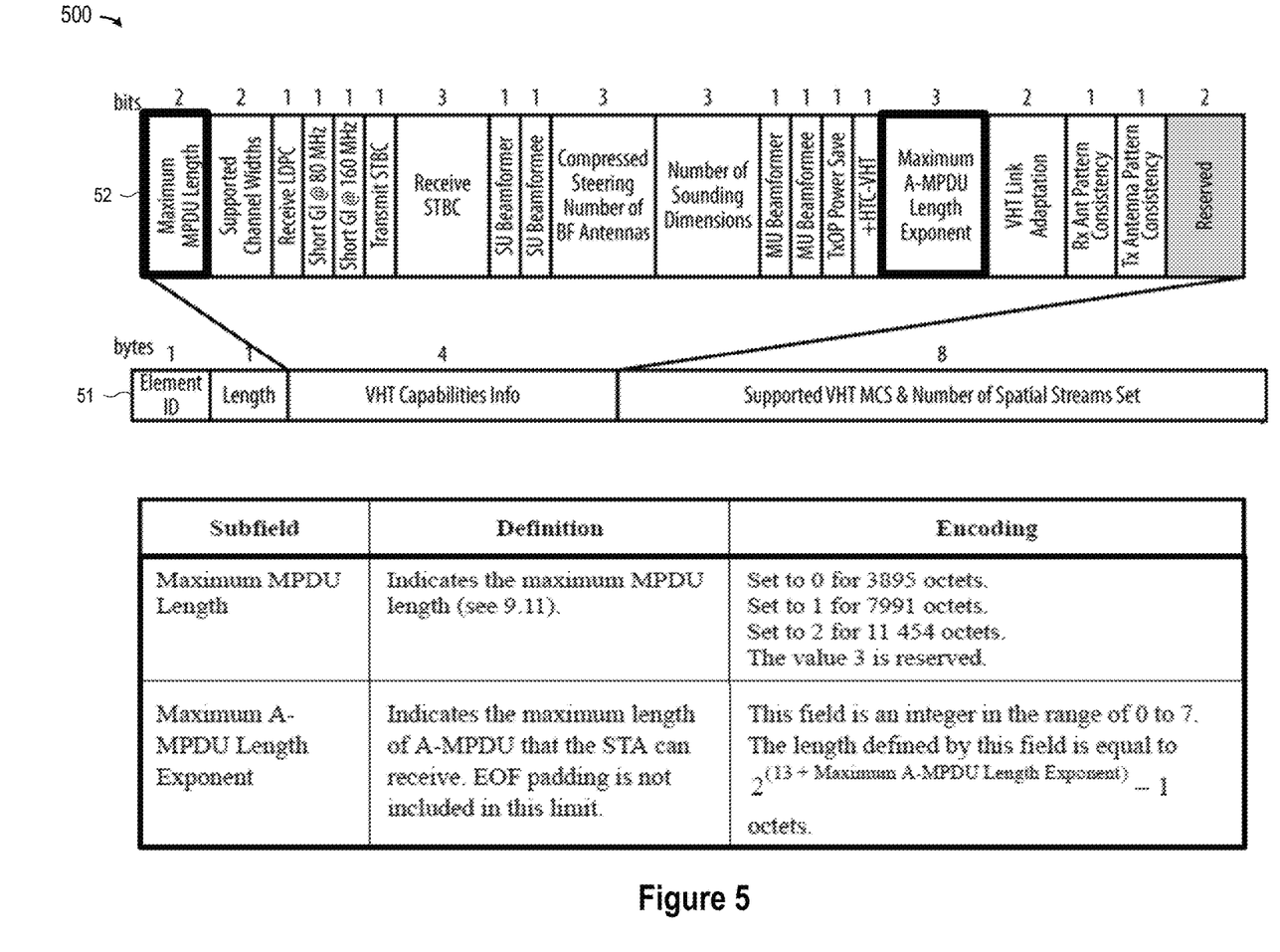
FIG. 5 illustrates a message format for a conventional 802.11 Very High Throughput (VHT) capabilities announcement message that is transmitted by a wireless communications device during negotiation of A-MPDU transmissions.

To provide additional contextual understanding of how an STA device may declare its A-MPDU frame aggregation capabilities, reference is now made to FIG. 5 which illustrates a message format 500 for an 802.11 Very High Throughput (VHT) capabilities element 51 that includes an element ID field (1 byte), length field (1 byte), VHT capabilities info field (4 bytes), and Supported VHT MCS & Number of Spatial Streams Set element (8 bytes). In the VHT Capabilities Info field 52, there are specified a number of fields, including a Maximum MPDU Length field (2 bits) and a Maximum A-MPDU Length Exponent (3 bits). The Maximum PDU Length bits indicate the maximum MPDU length that the STA device can receive by specifying a maximum MPDU length of 3895 octets (if the bits are set to 0), 7991 octets (if the bits are set to 1), and 11,454 octets (if the bits are set to 2). The Maximum A-MPDU Length Exponent field indicates the maximum length of the A-MPDU that the STA device can receive by specifying an encoding with an integer value i between 0 and 7 for calculating a maximum length value of $(2^{(13+i)})-1$ octets.

As seen from the foregoing, existing solutions for having wireless devices announce the A-MPDU/A-MSDU parameters do provide some flexibility in negotiating specific performance parameters, but there are associated signaling overhead costs that are not good for device interoperability where the peer STAs for the communication dynamically change very fast like in NGV environment. In particular, an upper MAC data service interface or layer is required to acquire the A-MSDU/A-MPDU parameters by having each wireless device notify the peer wireless devices of its A-MSDU/A-MPDU parameters.

To address these limitations from conventional solutions and others known to those skilled in the art, there is disclosed herein a wireless communication station (STA) device, system, apparatus, and methodology for using fixed A-MSDU, A-MPDU operation parameters to directly enable data frame aggregation in direct inter-vehicular wireless connectivity applications, thereby promoting interoperability and data throughput efficiency with Next Generation Vehicle-to-Everything (NGV) communications. Referring back to FIG. 1, this capability is provided in the wireless local area network (WLAN) 100 where each of the wireless devices 11, 21, 31, 41 is a wireless communication station (STA) device which is configured with one or more fixed A-MPDU/A-MSDU parameters 14, 24, 34, 44 for use in assembling and transmitting aggregated data frames 1-5 between the wireless communication station (STA) devices 11, 21, 31, 41. By configuring each NGV wireless communication station (STA) device with predetermined operational A-MPDU and/or A-MSDU parameters 14, 24, 34, 44, data frame aggregation can proceed quickly and efficiently without having to exchange association request and response messages to negotiate the transmission of aggregated data frames.

Figure 6:
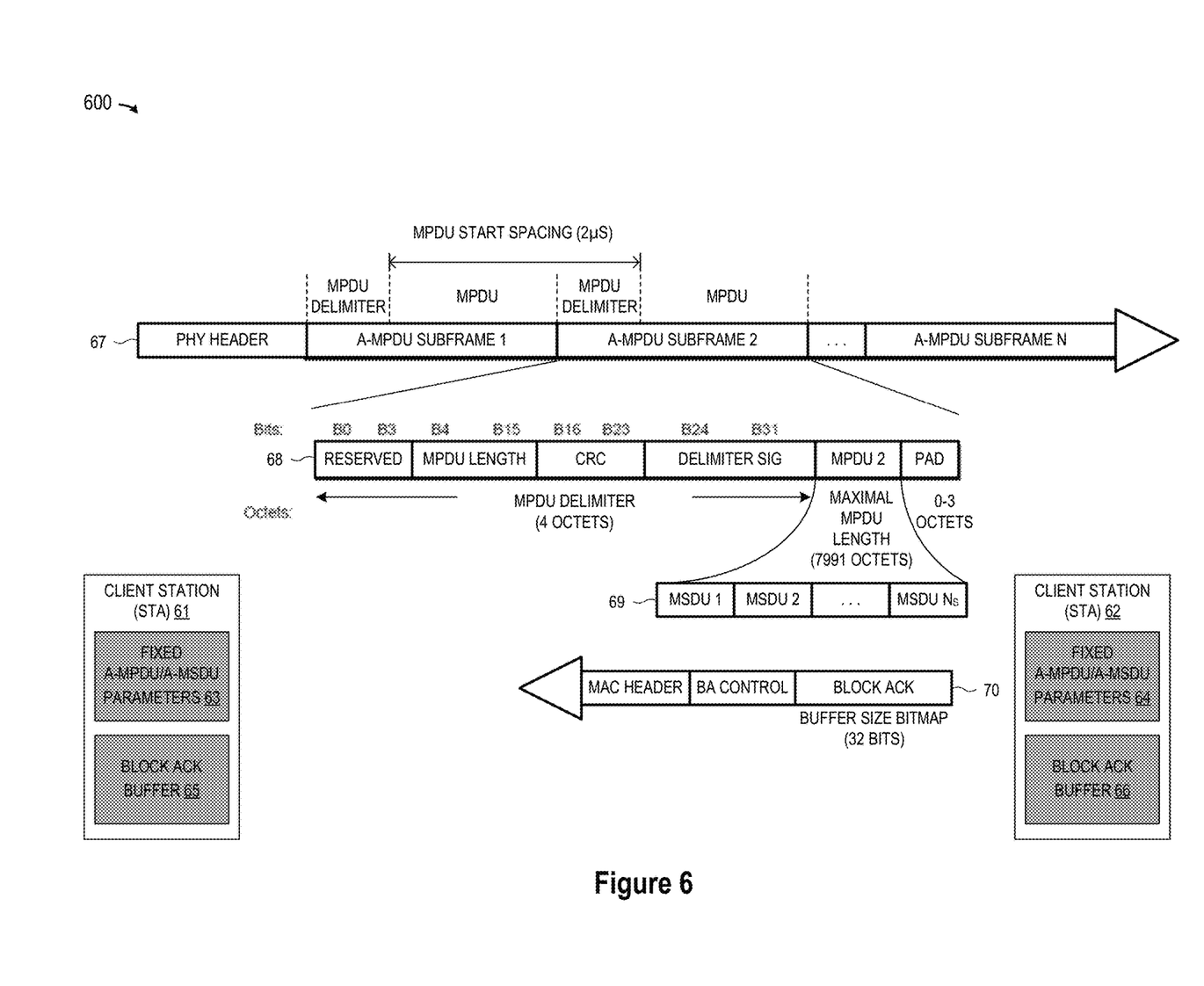
FIG. 6 is a simplified illustration of a plurality of wireless communication station (STA) devices which use fixed operational parameters to implement two-level A-MPDU/A-MSDU frame aggregation in accordance with selected embodiments of the present disclosure.

To provide additional details for an improved understanding of selected embodiments of the present disclosure, reference is now made to FIG. 6 which is a simplified illustration 600 of a plurality of wireless communication station (STA) devices 61, 62 which use fixed operational parameters 63, 64 and block ACK buffers 65, 66 to implement two-level A-MPDU/A-MSDU frame aggregation. As depicted, the first client station device 61 sends an aggregated media access control (MAC) protocol data unit (A-MPDU) frame 67 that includes a physical layer (PHY) header and a series of N A-MPDU subframes. Each A-MPDU subframe (e.g., A-MPDU subframe 2) may include a plurality of fields 68, including an MPDU delimiter (4 octets), an MPDU (variable length), and padding (0-3 octets). The depicted MPDU delimiter may include reserved bits (e.g., bits 0-3), MPDU length bits (e.g., bits 4-15), CRC bits (e.g., bits 16-23), and delimiter signature bits (e.g., bits 24-31). As disclosed herein the variable length of the MPDU may be specified in the MPDU Length field to range to no more than the Maximal MPDU Length (e.g., 7991 octets). By controlling the duration of the MPDU delimiter, the MPDUs in adjacent A-MPDU subframes are separated from one another by a fixed MPDU Start Spacing value (e.g., 2 µs) to indicate the amount of time that needs to be provided for the receiver of the A-MPDU to decrypt the MPDUs sent within an A-MPDU properly. Each MPDU may be an A-MSDU frame that includes a series of $N_S$ MAC service data unit (MSDU) subframes. For example, the MPDU 2 may carry an aggregated MSDU (A-MSDU) 69 including multiple MSDU subframes MSDU 1, MSDU 2, . . . MSDU $N_S$. Though not shown, each MSDU subframe may include a corresponding subframe header and padding. As disclosed herein, the first client station device 61 is able to automatically generate the A-MPDU frame 67 which is formatted with selected A-MPDU operational parameters to impose the MPDU Start Spacing and Maximal MPDU Length constraints, without having to negotiate or exchange configuration messages. By specifying predetermined A-MPDU and/or A-MSDU operational parameters at each NGV STA device 61, 62, such as the Maximal MPDU Length parameter and MPDU Start Spacing values, interoperability is simplified between the NGV STA devices 61, 62 as there is no requirement of negotiation signaling overhead or MAC data service interface changes. In similar fashion, In response to receiving the A-MPDU frame 67 and storing its MPDUs in the block ACK storage buffer 66, the second client station device 62 may send a block acknowledgment (BA) message 70. The BA message 70 may include an indicator that indicates whether the second client station device 62 properly processed the MPDUs in the A-MPDU frame 67, and may include an indication identifying individual sequence numbers of MPDUs that were not correctly received so that only the individual A-MPDU subframes have to be retransmitted. In selected embodiments, the second client station device 62 sends the BA message 70 that is formatted to include a PHY header, MAC header, and BA message which is formatted with selected A-MPDU operational parameters to reflect a predetermined minimum required Block ACK buffer size value for storing received MPDUs (e.g., 32 MPDUs) without having to negotiate or exchange configuration messages. For example, the BA message 70 may include a 64-bit bitmap for identifying which of 32 MPDUs received at the second client station device 62 for storage in the block ACK buffer 66 were not received. For processing A-MPDU frames transmitted from the second client station device 62 to the first client station device 61, the first client station device 61 includes fixed operational parameters 63 and block ACK buffers 65. By specifying the Block ACK buffer size value as a predetermined operational or hardware parameter at each NGV STA device 61, 62, device interoperability is enhanced by allowing Block ACK operation without requiring Block ACK negotiation.

Figure 7:
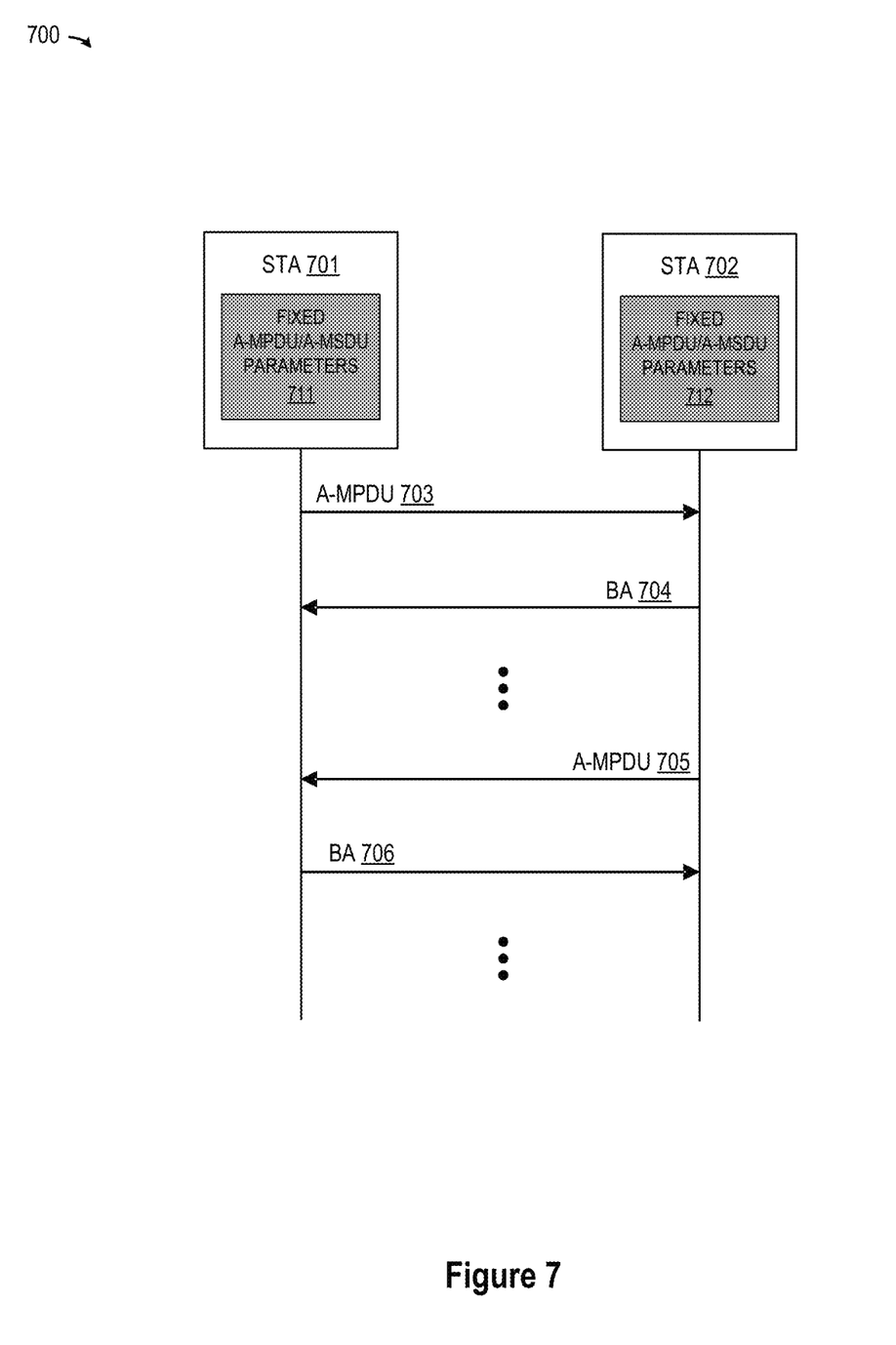
FIG. 7 illustrates an example message flow diagram to illustrate the operation of first and second wireless communication station (STA) devices which use fixed operational parameters to perform two-level A-MPDU/A-MSDU data frame aggregation with block acknowledgements without exchange negotiation messages in accordance with selected embodiments of the present disclosure.

To provide additional details for an improved understanding of selected embodiments of the present disclosure, reference is now made to FIG. 7 which depicts an example message flow diagram 700 to illustrate the operation of first and second wireless communication station (STA) devices 701, 702 which use fixed operational parameters 711, 712 to perform two-level A-MPDU/A-MSDU data frame aggregation with block acknowledgements without exchange negotiation messages. With the fixed operational parameters 711, 712 (e.g., Maximal MPDU size and A-MPDU length) known to the peer devices 701, 702, the operational parameters can be set by its host when STA 701, 702 is powered on. As a result, the example message flow 700 shows that the first STA device 701 and the second STA device 702 are each configured at power up with fixed A-MPDU/MSDU operational parameters 711, 712, and therefore do not need to exchange configuration or negotiation messages to verify they both support specified operational parameters for performing two-level A-MPDU/A-MSDU data frame aggregation.

This is illustrated in the message flow 700 where the first STA device 701 directly transmits the first MPDU message 703 that includes multiple MPDUs (such as an A-MPDU)

without first negotiating to establish a link. In particular, the first STA1 device 701 can transmit the A-MPDUs 703 to the second STA device 702 that satisfy the fixed operational parameters for BA buffer size, the maximum allowed Minimum MPDU Start Spacing, and the Maximal MPDU Size. In this case, the maximum A-MPDU length is decided by the BA buffer size and Maximum MPDU Size. In response to the A-MPDU transmission 703, the second wireless communication device 120 may determine to send a block acknowledgment message 704 to indicate if the second STA device 702 properly processed the A-MPDU transmission 703. In response, the first STA device 701 may process the BA message 704 and determine whether to resend any data frames that were not correctly received.

In similar fashion, the STA2 device 702 can use the fixed A-MPDU/A-MSDU parameters 712 to transmit A-MPDUs 705 to the first STA 701 which satisfy the fixed operational parameters for BA buffer size (the number of frames in A-MPDU is less than the negotiated size), maximum allowed Minimum MPDU Start Spacing, and Maximum MPDU Size. Again, the maximum A-MPDU length is decided by the BA buffer size and Maximum MPDU Size.

In accordance with the present disclosure, all NGV STAs should be configured with fixed operational parameters to support A-MSDU and A-MPDU data frame aggregation for purposes of compliance with any 802.11 standard requirements or for purposes of simplifying device interoperability and reducing signaling overhead costs and complexity. While using fixed A-MSDU/A-MPDU operational parameters does eliminate some operational flexibility between STA devices, such costs are more than outweighed by the benefits of reducing signal processing overhead, time delays, and consumption of valuable transmission bandwidth.

By now it should be appreciated that there has been provided an apparatus, method, and system for transmitting one or more aggregated data frames from a first station (STA) device to a second STA device in an wireless personal area network in accordance with a predetermined wireless protocol (e.g., the IEEE 802.15.4 protocol). In selected embodiments, the first and second STA devices are each Next Generation Vehicle-to-Everything (NGV) STA devices. In the disclosed methodology, the first STA device assembles and transmits a first aggregated MAC protocol data unit (A-MPDU) frame which includes a plurality of A-MPDU subframes characterized by a fixed MPDU Start Spacing parameter and a fixed maximal MPDU length parameter, where the first STA device is configured with the fixed MPDU Start Spacing parameter and the fixed maximal MPDU length parameter without negotiating association request and response messages with the second STA device. In selected embodiments, each A-MPDU subframe may include a plurality of aggregated MAC service data units having a combined length that is less than or equal to the fixed maximal MPDU length parameter. In addition, the first STA device receives and processes a first block acknowledgement (BA) message that was assembled and transmitted by the second STA device, where the BA message includes a BA bitmap identifying one or more of the plurality of A-MPDU subframes which are not successfully received by the second STA device, and where the BA bitmap has a size characterized by a fixed buffer size parameter which is configured at the second STA device without negotiating add BArequest (ADDBA Request) request and response messages with the first STA device. In selected embodiments, the fixed MPDU Start Spacing parameter has a predetermined value of 2 us, the fixed maximal MPDU length parameter has a predetermined value of 7991 octets, and the fixed buffer size parameter has a predetermined value of 32 MPDUs. Configured with the fixed MPDU Start Spacing parameter, fixed maximal MPDU length parameter, and fixed buffer size parameter, no BA negotiation is required between the first and second STA devices before exchanging BA message therebetween.

In another form, there is provided an apparatus, method, and system for receiving one or more aggregated data frames at a first station (STA) device that are transmitted by a second STA device in an wireless personal area network in accordance with a predetermined wireless protocol (e.g., the IEEE 802.15.4 protocol). In selected embodiments, the first and second STA devices are each Next Generation Vehicle-to-Everything (NGV) STA devices. In the disclosed methodology, the first STA device receives and processes a first aggregated MAC protocol data unit (A-MPDU) frame that is assembled and transmitted by the second STA device, where the first A-MPDU frame includes a plurality of A-MPDU subframes characterized by a fixed MPDU Start Spacing parameter and a fixed maximal MPDU length parameter, where the first and second STA devices are each configured with the fixed MPDU Start Spacing parameter and the fixed maximal MPDU length parameter without negotiating association request and response messages between the first and second STA devices. In selected embodiments, each A-MPDU subframe may include a plurality of aggregated MAC service data units having a combined length that is less than or equal to the fixed maximal MPDU length parameter. In addition, the first STA device identifies one or more of the plurality of A-MPDU subframes in the first A-MPDU frame which are not successfully received by the first STA device, and then assembles and transmits a first block acknowledgement (BA) message which includes a BA bitmap identifying the one or more of the plurality of A-MPDU subframes which are not successfully received by the first STA device, where the BA bitmap has a size characterized by a fixed buffer size parameter which is configured at the first STA device without negotiating add BA request (ADDBA Request) request and response messages between the first and second STA devices. In selected embodiments, the fixed MPDU Start Spacing parameter has a predetermined value of 7991 octets, the fixed maximal MPDU length parameter has a predetermined value of 2 μs, and the fixed buffer size parameter has a predetermined value of 32 MPDUs. With this configuration, no BA negotiation is required between the first and second STA devices before exchanging BA message therebetween.

In yet another form, there is provided a method, system, and apparatus for transmitting one or more aggregated data frames in a wireless personal area network in accordance with a predetermined wireless protocol (e.g., the IEEE 802.15.4 protocol). The disclosed apparatus includes a transceiver to exchange data with a wireless device, a processor, and a memory storing instructions. In selected embodiments, the apparatus and wireless device are each Next Generation Vehicle-to-Everything (NGV) STA devices. When executed by the processor, the instructions cause the apparatus to assemble and transmit a first aggregated MAC protocol data unit (A-MPDU) frame which includes a plurality of A-MPDU subframes characterized by a fixed MPDU Start Spacing parameter and a fixed maximal MPDU length parameter. In these embodiments, the apparatus is configured with the fixed MPDU Start Spacing parameter and the fixed maximal MPDU length parameter without negotiating association request and response messages with the wireless device. In selected embodiments, each A-MPDU subframe may include a plurality of aggregated MAC service data units having a combined length that is less than or equal to the fixed maximal MPDU length parameter. The execution of the instructions at the processor also causes the apparatus to receive and process a first block acknowledgement (BA) message that is assembled and transmitted by the wireless device, where the BA message includes a BA bitmap identifying one or more of the plurality of A-MPDU subframes which are not successfully received by the wireless device, where the BA bitmap has a size characterized by a fixed buffer size parameter which is configured at the wireless device without negotiating add BA request (ADDBA Request) request and response messages with the apparatus. In selected embodiments, the fixed MPDU Start Spacing parameter has a predetermined value of 7991 octets, the fixed maximal MPDU length parameter has a predetermined value of 2 µs, and the fixed buffer size parameter has a predetermined value of 32 MPDUs.

Although the described exemplary embodiments disclosed herein are directed to an NGV wireless communication station (STA) devices which uses fixed A-MSDU, A-MPDU operation parameters to directly enable data frame aggregation in direct inter-vehicular wireless connectivity applications and methods for operating same, the present invention is not necessarily limited to the example embodiments which illustrate inventive aspects of the present invention that are applicable to a wide variety of circuit designs and operations. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the identification of the circuit design and configurations provided herein is merely by way of illustration and not limitation and other circuit arrangements may be used in order to configure wireless communication devices with fixed A-MSDU, A-MPDU operation parameters. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts. When implemented in hardware, the hardware may comprise one or more of discrete components, an integrated circuit, an application-specific integrated circuit (ASIC), a programmable logic device (PLD), etc.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for transmitting one or more aggregated data frames from a first station (STA) device to a second STA device in a wireless personal area network in accordance with IEEE 802.11bc protocol, comprising:
    assembling and transmitting, by the first STA device, a first aggregated MAC protocol data unit (A-MPDU) frame comprising a plurality of A-MPDU subframes characterized by a fixed MPDU start spacing parameter and a fixed maximal MPDU length parameter, where the first STA device is configured with the fixed MPDU Start Spacing parameter and the fixed maximal MPDU length parameter, and without negotiating association request and response messages with the second STA device; and
    receiving and processing, by the first STA device, a first block acknowledgement (BA) message that is assembled and transmitted by the second STA device, where the BA message comprises a BA bitmap identifying one or more of the plurality of A-MPDU subframes which are not successfully received by the second STA device, and
    where the BA bitmap has a size characterized by a fixed buffer size parameter which is configured at the second STA device without negotiating add BArequest (ADDBA Request) request and response messages with the first STA device where the first and second STA devices each comprise Next Generation Vehicle-to-Everything (NGV) STA devices.

2. The method of claim 1, where the fixed MPDU start spacing parameter has a predetermined value of 7991 octets.

3. The method of claim 1, where the fixed maximal MPDU length parameter has a predetermined value of 2 µs.

4. The method of claim 1, where the fixed buffer size parameter has a predetermined value of 32 MPDUs.

5. The method of claim 1, where no BA negotiation is required between the first and second STA devices before exchanging BA message therebetween.

6. The method of claim 1, where each of the plurality of A-MPDU subframes comprises a plurality of aggregated MAC service data units having a combined length that is less than or equal to the fixed maximal MPDU length parameter.

7. A method for receiving one or more aggregated data frames at a first station (STA) device that are transmitted by a second STA device in a wireless personal area network in accordance with IEEE 802.11bc protocol, comprising:

receiving and processing, by the first STA device, a first aggregated MAC protocol data unit (A-MPDU) frame that is assembled and transmitted by the second STA device, where the first A-MPDU frame comprises a plurality of A-MPDU subframes characterized by a fixed MPDU start spacing parameter and a fixed maximal MPDU length parameter, where the first and second STA devices are each configured with the fixed MPDU start spacing parameter and the fixed maximal MPDU length parameter, and without negotiating association request and response messages between the first and second STA devices;

identifying, by the first STA device, one or more of the plurality of A-MPDU subframes in the first A-MPDU frame which are not successfully received by the first STA device; and assembling and transmitting, by the first STA device, a first block acknowledgement (BA) message comprising a BA bitmap identifying the one or more of the plurality of A-MPDU subframes which are not successfully received by the first STA device, where the BA bitmap has a size characterized by a fixed buffer size parameter which is configured at the first STA device without negotiating add BArequest (ADDBA Request) request and response messages between the first and second STA devices where the first and second STA devices each comprise Next Generation Vehicle-to-Everything (NGV) STA devices.

8. The method of claim 7, where the fixed MPDU start spacing parameter has a predetermined value of 7991 octets.

9. The method of claim 7, where the fixed maximal MPDU length parameter has a predetermined value of 2 µs.

10. The method of claim 7, where the fixed buffer size parameter has a predetermined value of 32 MPDUs.

11. The method of claim 7, where no BA negotiation is required between the first and second STA devices before exchanging BA message therebetween.

12. The method of claim 7, where each of the plurality of A-MPDU subframes comprises a plurality of aggregated MAC service data units having a combined length that is less than or equal to the fixed maximal MPDU length parameter.

13. An apparatus for transmitting one or more aggregated data frames in a wireless personal area network in accordance with IEEE 802.11bc protocol, comprising:

a transceiver to exchange data with a wireless device;
a processor; and
a memory storing instructions that, when executed by the processor, cause the apparatus to:

assemble and transmit a first aggregated MAC protocol data unit (A-MPDU) frame comprising a plurality of A-MPDU subframes characterized by a fixed MPDU start spacing parameter and a fixed maximal MPDU length parameter, where the apparatus is configured with the fixed MPDU start spacing parameter and the fixed maximal MPDU length parameter, and without negotiating association request and response messages with the wireless device; and receive and process a first block acknowledgement (BA) message that is assembled and transmitted by the wireless device, where the BA message comprises a BA bitmap identifying one or more of the plurality of A-MPDU subframes which are not successfully received by the wireless device, and where the BA bitmap has a size characterized by a fixed buffer size parameter which is configured at the wireless device without negotiating add BArequest (ADDBA Request) request and response messages with the apparatus where the apparatus and the wireless device are each wireless Next Generation Vehicle-to-Everything (NGV) station (STA) devices.

14. The apparatus of claim 13, where the fixed MPDU start spacing parameter has a predetermined value of 7991 octets.

15. The apparatus of claim 13, where the fixed maximal MPDU length parameter has a predetermined value of 2 µs.

16. The apparatus of claim 13, where the fixed buffer size parameter has a predetermined value of 32 MPDUs.

17. The apparatus of claim 13, where each of the plurality of A-MPDU subframes comprises a plurality of aggregated MAC service data units having a combined length that is less than or equal to the fixed maximal MPDU length parameter.

\* \* \* \* \*